(12) United States Patent
Behera et al.

(10) Patent No.: US 12,056,093 B2
(45) Date of Patent: Aug. 6, 2024

(54) DEDUPLICATION FOR CLOUD STORAGE OPERATIONS

(71) Applicant: Dell Products L.P., Round Rock, TX (US)

(72) Inventors: Sarat Kumar Behera, Bangalore (IN); Anurag Bhatnagar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/972,688

(22) Filed: Oct. 25, 2022

(65) Prior Publication Data

US 2024/0134826 A1    Apr. 25, 2024

(51) Int. Cl.
*G06F 16/174* (2019.01)
*G06F 16/14* (2019.01)

(52) U.S. Cl.
CPC ........ *G06F 16/1748* (2019.01); *G06F 16/152* (2019.01)

(58) Field of Classification Search
CPC ............... G06F 16/1748; G06F 16/152; G06F 16/1752; G06F 16/174; G06F 16/119; G06F 16/185
USPC ........................................................ 707/692
See application file for complete search history.

(56) References Cited

U.S. PATENT DOCUMENTS

| | | | |
|---|---|---|---|
| 8,595,243 B1 * | 11/2013 | Gunda | G06F 16/1748 707/758 |
| 8,626,723 B2 * | 1/2014 | Ben-Shaul | G06F 3/067 707/692 |
| 8,650,162 B1 * | 2/2014 | Vaikar | G06F 11/1453 707/692 |
| 9,262,280 B1 * | 2/2016 | Auchmoody | G06F 3/0614 |
| 9,305,007 B1 * | 4/2016 | Efstathopoulos | G06F 16/1748 |
| 9,323,758 B1 * | 4/2016 | Stacey | G06F 16/113 |
| 10,552,081 B1 * | 2/2020 | Steinhauer | G06F 3/0647 |
| 10,613,761 B1 * | 4/2020 | Zhao | H04L 67/1095 |
| 10,733,142 B1 * | 8/2020 | Madan | G06F 16/185 |

(Continued)

FOREIGN PATENT DOCUMENTS

| | | | | |
|---|---|---|---|---|
| CN | 109828966 A | * | 5/2019 | |
| CN | 114880297 A | * | 8/2022 | |
| EP | 4053703 A1 | * | 9/2022 | G06F 11/1469 |

OTHER PUBLICATIONS

Takata et al., "Event-Notification-Based Inactive File Search for Large-Scale File Systems", 2012 Digest APMRC, 2012, pp. 1-7. (Year: 2012).*

(Continued)

*Primary Examiner* — Phuong Thao Cao
(74) *Attorney, Agent, or Firm* — Ryan, Mason & Lewis LLP

(57) ABSTRACT

A method comprises computing a hash value for at least one file of a plurality of files in connection with a file tiering operation of the plurality of files from a source storage location to a target storage location. The hash value is compared to one or more hash values corresponding to one or more other files of the plurality of files. Based at least in part on the comparing, a determination is made whether the hash value is the same as any of the one or more hash values. The at least one file is identified as a duplicate file in response to an affirmative determination. The target storage location comprises a cloud storage platform.

20 Claims, 6 Drawing Sheets

(56) References Cited

U.S. PATENT DOCUMENTS

| | | | | |
|---|---|---|---|---|
| 10,831,391 | B2* | 11/2020 | Madan | G06F 3/0608 |
| 10,915,497 | B1* | 2/2021 | Bono | G06F 16/185 |
| 11,662,907 | B2* | 5/2023 | Lin | G06F 3/0608 |
| | | | | 707/692 |
| 2009/0157769 | A1* | 6/2009 | Lee | G06F 16/174 |
| 2009/0204649 | A1* | 8/2009 | Wong | G06F 16/1744 |
| 2011/0078112 | A1* | 3/2011 | Takata | G06F 16/185 |
| | | | | 709/219 |
| 2012/0246206 | A1* | 9/2012 | Yamada | H04L 67/1095 |
| | | | | 707/827 |
| 2014/0149476 | A1* | 5/2014 | Kishimoto | G06F 16/1748 |
| | | | | 707/827 |
| 2014/0244937 | A1* | 8/2014 | Bloomstein | G06F 16/1748 |
| | | | | 709/212 |
| 2015/0363271 | A1* | 12/2015 | Haustein | G06F 16/1873 |
| | | | | 707/682 |
| 2019/0155920 | A1* | 5/2019 | Araki | H04L 51/18 |
| 2019/0182322 | A1* | 6/2019 | Kumar | H04L 67/1095 |
| 2019/0207766 | A1* | 7/2019 | Sanghvi | H04L 9/3239 |
| 2022/0188198 | A1* | 6/2022 | Nagarajegowda | G06F 40/40 |
| 2022/0197748 | A1* | 6/2022 | Behera | G06F 11/1443 |
| 2022/0236901 | A1* | 7/2022 | Rao | G06F 3/0611 |
| 2022/0398221 | A1* | 12/2022 | Zou | G06F 16/164 |

OTHER PUBLICATIONS

Cao et al., "TDDFS: A Tier-Aware Data Deduplication-Based File System", ACM Transactions on Storage, Feb. 2019, vol. 15, No. 1, Article 4, pp. 1-26. (Year: 2019).*

Xu et al., "YuruBackup: A Space-Efficient and Highly Scalable Incremental Backup System in the Cloud", International Journal of Parallel Programming, 2015, vol. 43(3), pp. 316-338. (Year: 2015).*

Dell EMC, "Dell EMC Unity: Cloud Tiering Appliance (CTA) A Detailed Review," White Paper, Mar. 2019, 32 pages.

Muonics, Inc., "Object Identifier Values," MIB Smithy User's Guide, http://www.muonics.com/Docs/MIBSmithy/UserGuide/oidvalues.php, Accessed Sep. 10, 2020, 3 pages.

* cited by examiner

| File hash | OID |
|---|---|
| 5b0e19261243617166e70fb8d8821d40 | /uuid1/uuid2/fs/share/file1 |
| 5b0e19260e69617166e70fb8d8821d40 | /uuid1/uuid2/fs/share/file2 |

DEDUPLICATION FOR CLOUD STORAGE OPERATIONS

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, low-cost object and cloud storage tiers.

In a file system, there may be multiple files, possibly millions of files, where many of the files are duplicates of other files. The duplicate files may be present at different locations in the file system and/or have different names. In addition, some of the duplicate files may be very large (e.g., gigabytes (GBs)). Under current approaches, the duplicate files are tiered to cloud storage, wasting crucial cloud storage space on the duplicate files.

SUMMARY

Illustrative embodiments provide techniques for management of cloud storage operations, including techniques to identify and prevent duplicate files from being tiered to cloud storage.

In one embodiment, a method comprises computing a hash value for at least one file of a plurality of files in connection with a file tiering operation of the plurality of files from a source storage location to a target storage location. The hash value is compared to one or more hash values corresponding to one or more other files of the plurality of files. Based at least in part on the comparing, a determination is made whether the hash value is the same as any of the one or more hash values. The at least one file is identified as a duplicate file in response to an affirmative determination. The target storage location comprises a cloud storage platform.

These and other illustrative embodiments include, without limitation, methods, apparatus, networks, systems and processor-readable storage media.

BRIEF DESCRIPTION OF THE DRAWINGS

FIG. 3 depicts a table of hash and object identifier (OID) information for tiered files determined to be unique according to an illustrative embodiment.

DETAILED DESCRIPTION

Figure 1:
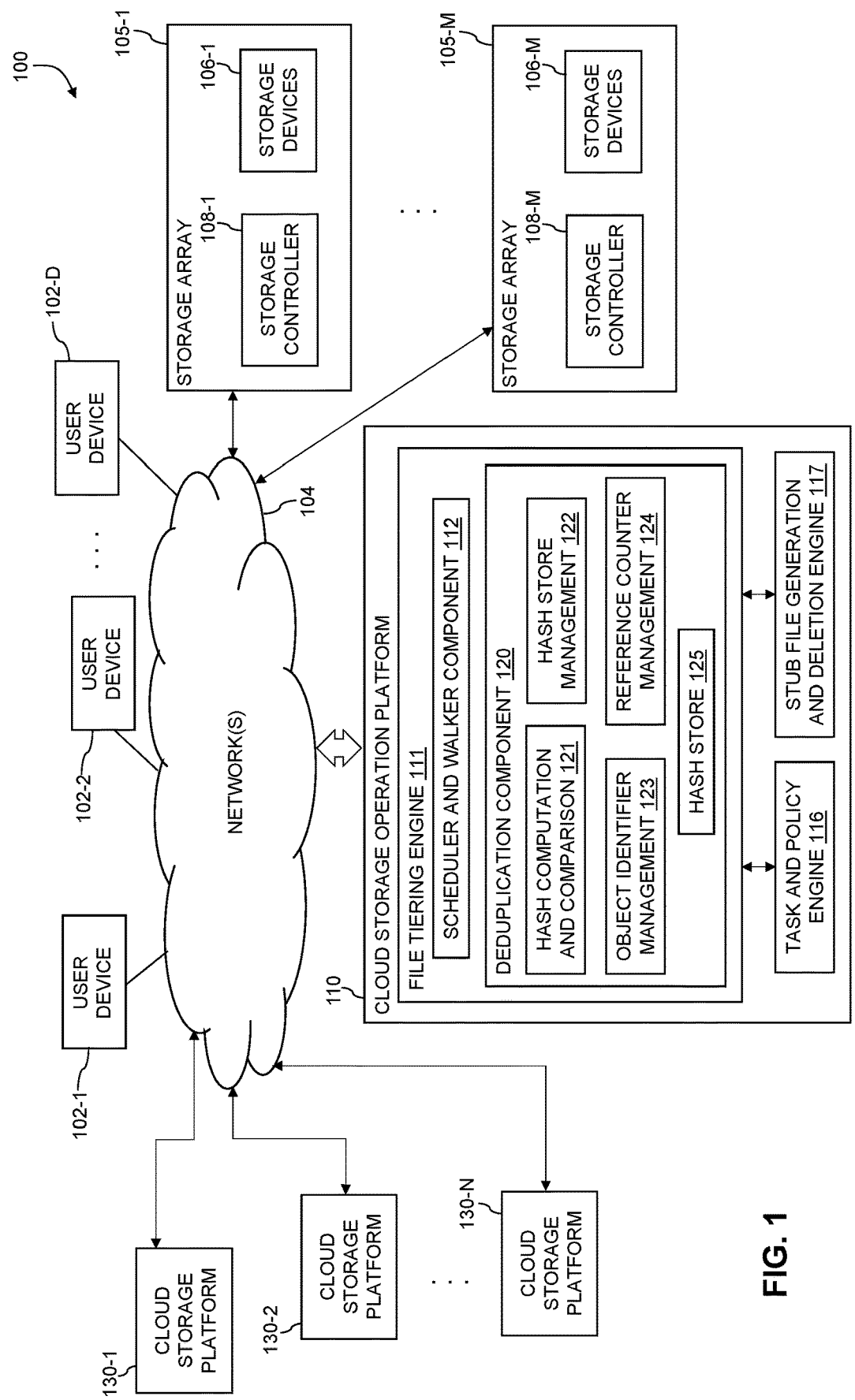
FIG. 1 depicts details of an information processing system with a cloud storage operation platform for identifying and preventing duplicate files from being stored in a cloud location according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived or tiered to a different location, such as, for example, a cloud storage platform. According to an embodiment, when a stub file is read in an input-output (IO) operation, the IO operation is passed through to the original file located in the archive location, and the original file may be presented to a user as if the original file were in its original location on the storage device. The stub file occupies less memory space ("size on disk") than the original file.

Under conventional techniques, when files are tiered, all of the files satisfying the criteria for a given tiering task are tiered to a cloud storage location, even if they are duplicate files. Additionally, there is a one-to-one mapping between files and cloud objects (i.e., for each tiered file, there is a cloud object) regardless of whether the files are duplicate files.

Illustrative embodiments provide technical solutions which use deduplication to eliminate redundant files. Advantageously, the embodiments create one cloud object for duplicate files and have each corresponding stub file point to the single cloud object. For example, in a non-limiting operational example, assume there are three files (a.txt, b.txt and c.txt), and a.txt and c.txt are duplicate files with different names. Instead of creating 3 different cloud objects, the illustrative embodiments create a single cloud object for a.txt and c.txt, and another object for b.txt. Stub files for a.txt and c.txt point to the same cloud object.

FIG. 1 shows an information processing system 100 configured in accordance with an illustrative embodiment. The information processing system 100 comprises user devices 102-1, 102-2, ... 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, ... 105-M, collectively referred to herein as storage arrays 105. The storage arrays 105 comprise respective sets of storage devices 106-1, ... 106-M, collectively referred to herein as storage devices 106, coupled to respective storage controllers 108-1, ... 108-M, collectively referred to herein as storage controllers 108.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which file tiering operations such as, for example, archiving and/or backing up are being performed. For example, in some embodiments, the user devices 102 are assumed to be associated with repair technicians, system administrators, information technology (IT) managers, software developers, release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, ... 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell© EMC© Elastic Cloud Storage (ECS), Microsoft© Azure©, Amazon© S3, and/or IBM© Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for identifying and preventing duplicate files from being stored in a cloud location. Referring to FIG. 1, the cloud storage operation platform 110 comprises a file tiering engine 111, a task and policy engine 116 and a stub file generation and deletion engine 117. The file tiering engine 111 comprises a scheduler and walker component 112 and a deduplication component 120. The deduplication component 120 comprises a hash computation and comparison layer 121, a hash store management layer 122, an object identifier management layer, a reference counter management layer 124 and a hash store 125.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the scheduler and walker component 112 of the cloud storage operation platform 110. The job scheduler interacts with the task and policy engine 116. For example, once a tiering task and corresponding policies (e.g., types of files to be tiered) have been specified by, for example, a user via one of the user devices 102, the task and policies are provided to the scheduler and walker component 112 from the task and policy engine 116. The policies and their constraints are used by the scheduler and walker component 112 as a filter to select files which are to be tiered. The scheduler and walker component 112 schedules file tiering tasks and communicates with the storage arrays 105 to retrieve lists of files to be tiered based on the specified policies from the task and policy engine 116. For example, referring to the operational flow 200 in FIG. 2, following the start of the flow at block 201, the cloud storage operation platform 110, more particularly, the file tiering engine 111, scans one or more of the storage arrays 105 for the files to be tiered and retrieves the relevant files. Tasks may start at a scheduled time that can be pre-configured or user-specified via one or more user interfaces. Upon receipt of the relevant files (e.g., files matching the policies) from one or more of the storage arrays 105, the scheduler and walker component 112 sends the files to the deduplication component 120 for further processing as described herein below.

The cloud storage operation platform 110 can include at least one application programming interface (API) that permits an external component to control selection between various modes of operation. One or more external components can access the configuration file via such an API in order to control a mode of operation of the cloud storage operation platform 110. For example, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays and/or user devices 102.

In a file tiering process (also referred to herein as "cloud tiering"), the task and policy engine 116 is configured to identify files that fit an administrator-defined criteria, and the cloud storage operation platform 110 initiates movement of the identified files to a cloud storage platform 130. The stub file generation and deletion engine 117 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102. Stub files comprise information (e.g., object identifiers (OIDs)) about destinations in the cloud storage platforms 130 where the files corresponding to the stub files are located.

In a file tiering operation, files are moved from a primary file system (e.g., storage array 105) to secondary storage (e.g., cloud storage platform 130). In doing so, storage space on the primary file system is freed up, leaving the stub files, which are typically small files (e.g., 8 KB or 10 KB), and which include necessary information to access the tiered files from secondary storage. Tiering appliances (e.g., CTAs) like the cloud storage operation platform 110, run scheduled jobs to move the files from a primary file system and tier them to a cloud storage platform 130. As noted above, the files to be tiered may be selected based on one or more policies.

In an operation referred to as, for example, as recall or rehydration, a user accesses the stub files or runs a recall task (via, for example the task and policy engine 116), so that the cloud storage operation platform 110 retrieves the tiered files from one or more cloud servers of one or more cloud storage platforms 130 to be downloaded (e.g., rehydrated) back to the primary file system. In an operation referred to as "delete orphan," when a stub file is deleted, its corresponding cloud object is also deleted.

Figure 2:
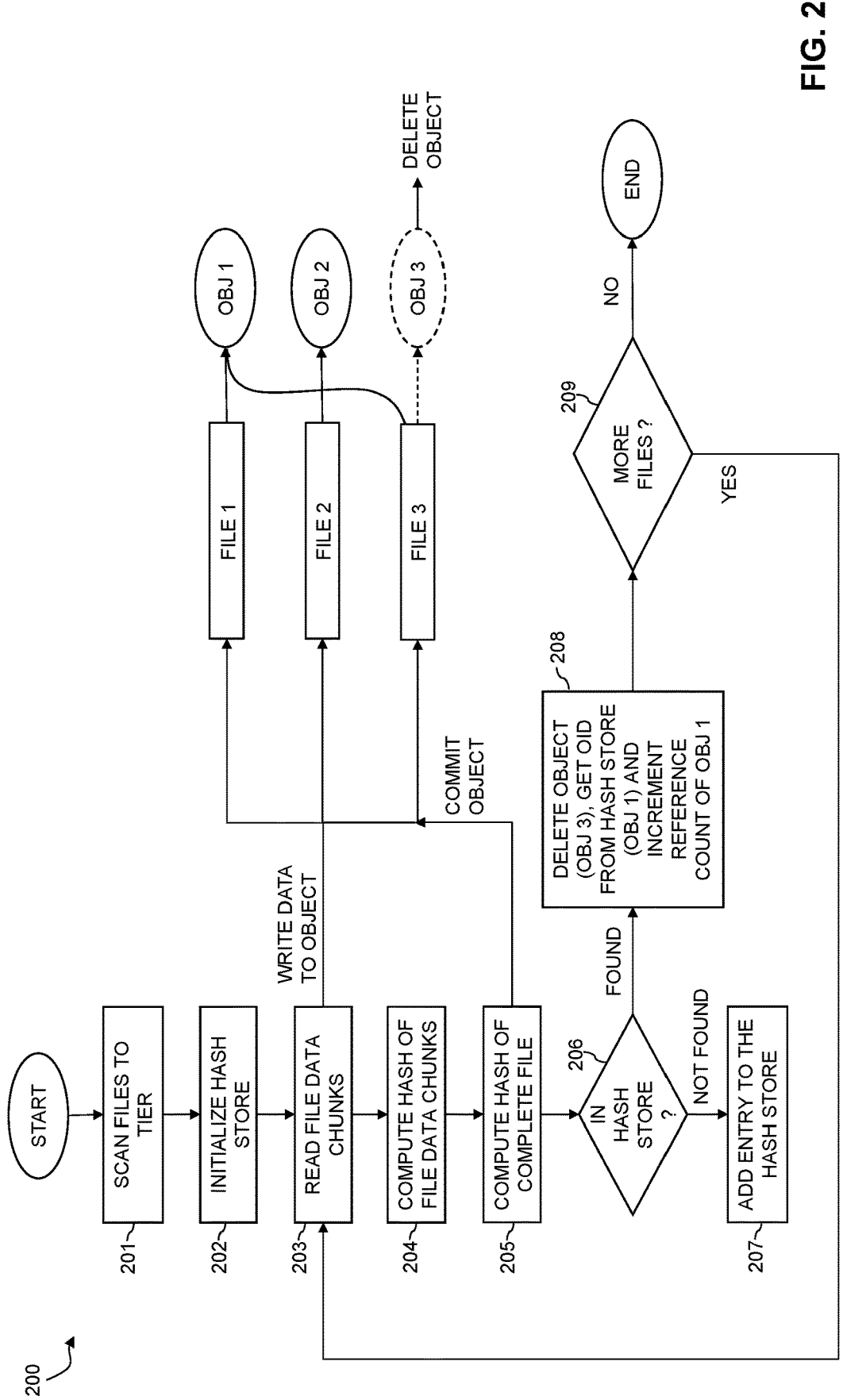
FIG. 2 depicts details of an operational flow for implementing deduplication in connection with a file tiering operation according to an illustrative embodiment.

According to illustrative embodiments, in connection with block 201 in FIG. 2, the scheduler and walker component 112 of the file tiering engine 111 scans, for example, files in the storage array 105 and applies policies to each file. If there are multiple policies, the scheduler and walker component 112 applies the polices to a given file until a rule evaluates to "true," and then takes the action associated with the rule, such as, for example, "tier" or "don't tier." Some examples of policies governing whether files are tiered may be based on one or more constraints such as, for example, when a file was last accessed or modified, when file attributes were last changed, and/or a size of a file (e.g., >10 MB). Policies may also be based on file names (e.g., only tier files having certain names or parts of names) and/or directory name (e.g., only tier files from specified directories or from directories having certain names or parts of names).

According to illustrative embodiments, deduplication techniques are applied to a tiering job. For example, a first file that is tiered is considered unique, and any file that is to be tiered after previously tiered files will be compared with the previously tiered files. If a later file is different from an earlier tiered file, the later file is identified as unique and tiered. If a later file is the same as an earlier tiered file, the later file is identified as a duplicate file.

To determine whether a file to be or currently being tiered is a duplicate of another file, the embodiments compare the file with the previously tiered files. However, since a cloud storage operation platform 110 (e.g., CTA) may continuously stream data to a cloud storage platform 130, the cloud storage operation platform 110 may not have file data for all previously tiered files at a given point of time. In order to implement the comparison, the hash computation and comparison layer 121 of the deduplication component 120 computes the hash values (md5sum, sha256, etc.) of previously tiered files and of the file to be or currently being tiered, and compares the computed hash value of the file to be or currently being tiered to that of the previously tiered files.

In illustrative embodiments, the hash store management layer 122 of the cloud storage operation platform 110 maintains a hash store (e.g., hash store 125) whose lifetime is limited to the duration of a tiering job. The hash store management layer 122 deletes hash stores 125 upon completion of tiering jobs, and generates new hash stores 125 for new tiering jobs. The hash stores 125 (also referred to as "databases" herein) maintain information about all the unique files already tiered in a file tiering job. For example, the table 300 in FIG. 3 depicts an example of the information maintained by the hash stores 125. As can be seen in the table 300, the information includes a hash of an entire file and a corresponding OID identifying an object on a cloud storage platform 130 where the file is located.

Referring back to the operational flow 200, following scanning of the files to tier at block 201, at block 202, the hash store management layer 122 initializes a hash store 125 for the tiering job. At block 203, data chunks of a file are read, and at block 204, the hash values of the file data chunks are computed. At the end of the file data, at block 205, the hash of the complete file is computed based, at least in part, on the hash values of the file data chunks. For example, md5sum, sha256 or other hashing algorithms can be used.

In illustrative embodiments, as shown in FIG. 2, as file data chunks are read, the data from the file data chunks can be written to objects in a cloud storage platform 130. For example, in the operational example used in connection with FIG. 2, three files File 1, File 2 and File 3 are shown with corresponding objects Obj 1, Obj 2 and Obj 3. It is to be understood that three files are used as an example, and the embodiments are not limited three files. More or less than three files can be tiered.

At the end of the file data for each file, and the hashes of the complete files are computed, the objects for each file are committed to the cloud storage platform 130. As explained in more detail herein below, following deduplication processing, one or more of the objects (e.g., Obj 3) may be deleted from the cloud storage platform 130 if a file (e.g., File 3) is identified as a duplicate of another file.

At block 206, the hash computation and comparison layer 121 searches in the hash store 125 for the computed hash value of a particular file to be tiered to determine whether the computed hash file of the particular file matches with (e.g., is the same as) any of the existing hash values of files previously determined to be unique. If there is no match with existing hash values in the hash store 125 (Not Found), the operational flow 200 proceeds to block 207, where the hash store management layer 122 adds an entry to the hash store 125 including the hash value for the particular file with its OID. In this case, since there is no match with a hash value in the hash store 125, the particular file is determined to be unique (e.g., not a duplicate file). If, at block 206, a match is found with an existing hash value in the hash store 125 (Found), the object identifier management layer 123 assigns the OID corresponding to the existing matching hash value to the particular file. In more detail, in the case of a matching hash value, the particular file is identified as a duplicate file of the file with the matching hash value in the hash store 125.

At block 208, any objects that were created for the duplicate file in the cloud storage platform 130 are deleted from the cloud storage platform 130. For example, in the operational example, File 3 is identified as a duplicate of File 1 since the computed hash value for File 3 is the same as the hash value for File 1 in the hash store 125. As a result, object Obj 3 is determined to be a duplicate of Obj 1 and is deleted from the cloud storage platform 130 to free up space therein.

According to illustrative embodiments, the stub file generation and deletion engine 117 generates a stub file for a file identified as a duplicate of another file. In this case, the stub file for the duplicate file designates the object identifier associated with the object for the file of which it is a duplicate. For example, in keeping with the operational example of Files 1-3, a stub file for File 3, which is deemed a duplicate of File 1, designates the OID associated with Obj 1. A stub file for File 1 also designates the OID associated with Obj 1, and a stub file for File 2 designates an OID associated with Obj 2. Similarly, as noted above in connection with the files a.txt, b.txt and c.txt, where a.txt and c.txt are duplicate files with different names, a single cloud object corresponds to a.txt and c.txt, and another cloud object corresponds to b.txt. Stub files for a.txt and c.txt point to the same cloud object, while a stub file for b.txt points to the cloud object corresponding to b.txt.

When an object is referenced by more than one stub file, the reference counter management layer 124 generates or causes generation of a reference counter tag for the object which indicates a number of stub files designating the object. For example, if two stub files designate the same object, the reference counter tag for that object will indicate a value of 2. Referring back to block 208 in FIG. 2, since a stub file for File 3 is generated which points to Obj 1, a reference counter tag for Obj 1 is increased by one to correspond to the scenario where the stub files for Files 1 and 3 both point to Obj 1.

When a file is identified as unique due to no match with a hash value in the hash store 125 (e.g., File 2), the object identifier management layer 123 generates an OID for the object on the cloud storage platform corresponding to the unique file. The hash store management layer 122 adds the hash value and the OID corresponding to the unique file to the hash store 125. In addition, the stub file generation and deletion engine 117 generates a stub file for the unique file which designates the OID associated with the object (e.g., Obj 2) for the unique file. In the case of a unique file, a reference counter tag for the object corresponding to the unique file will indicate a value of 1.

As noted above, in an operation referred to as delete orphan, when a stub file is deleted, its corresponding cloud object is also deleted. However, if there are multiple stub files in a file system pointing to the same cloud object, and less than the total number of the multiple stub files are deleted, the illustrative embodiments provide techniques to maintain the cloud object in this situation. According to one or more embodiments, when a delete orphan request is received for a cloud object, if a reference counter tag corresponding to the cloud object indicates a value of 1 (meaning only one stub file is referencing the cloud object), the cloud storage operation platform 110 causes deletion of the cloud object (e.g., provides a command that the cloud object be deleted). When a delete orphan request is received for a cloud object, if a reference counter tag corresponding to the cloud object indicates a value of greater than 1 (meaning more than one stub file is referencing the cloud object), the reference count is decreased by one in response to the delete orphan request, and the cloud object is not deleted.

Referring back to FIG. 2, following block 208, at block 209, if there more files to be tiered, the flow returns to block 203, where the remaining steps are repeated. If there are no more files to be tiered, the flow ends. Once a tiering job is completed, hash store management layer 122 deletes the hash store 125 for that tiering job. New hash stores 125 are generated for subsequent tiering jobs.

According to one or more embodiments, the hash store 125 or other databases used herein can be configured according to a relational database management system (RDBMS) (e.g., PostgreSQL). The hash store 125 or other databases in some embodiments are implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the file tiering engine 111, the task and policy engine 116 and the stub file generation and deletion engine 117 in other embodiments can be implemented at least in part externally to the cloud storage operation platform 110, for example, as stand-alone servers, sets of servers or other types of systems coupled to the network 104. For example, the file tiering engine 111, the task and policy engine 116 and the stub file generation and deletion engine 117 may be provided as cloud services accessible by the cloud storage operation platform 110.

The file tiering engine 111, the task and policy engine 116 and the stub file generation and deletion engine 117 in the FIG. 1 embodiment are each assumed to be implemented using at least one processing device. Each such processing device generally comprises at least one processor and an associated memory, and implements one or more functional modules for controlling certain features of the file tiering engine 111, the task and policy engine 116 and/or the stub file generation and deletion engine 117.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the file tiering engine 111, the task and policy engine 116, the stub file generation and deletion engine 117 and other components of the cloud storage operation platform 110 in the present embodiment are shown as part of the cloud storage operation platform 110, at least a portion of the file tiering engine 111, the task and policy engine 116, the stub file generation and deletion engine 117 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the file tiering engine 111, the task and policy engine 116, the stub file generation and deletion engine 117 and other components of the cloud storage operation platform 110, and the elements thereof can each be implemented in the form of one or more LXCs running on one or more VMs. Other arrangements of one or more processing devices of a processing platform can be used to implement the file tiering engine 111, the task and policy engine 116 and the stub file generation and deletion engine 117, as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the file tiering engine 111, the task and policy engine 116, the stub file generation and deletion engine 117 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the file tiering engine 111, the task and policy engine 116, the stub file generation and deletion engine 117 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

Figure 4:
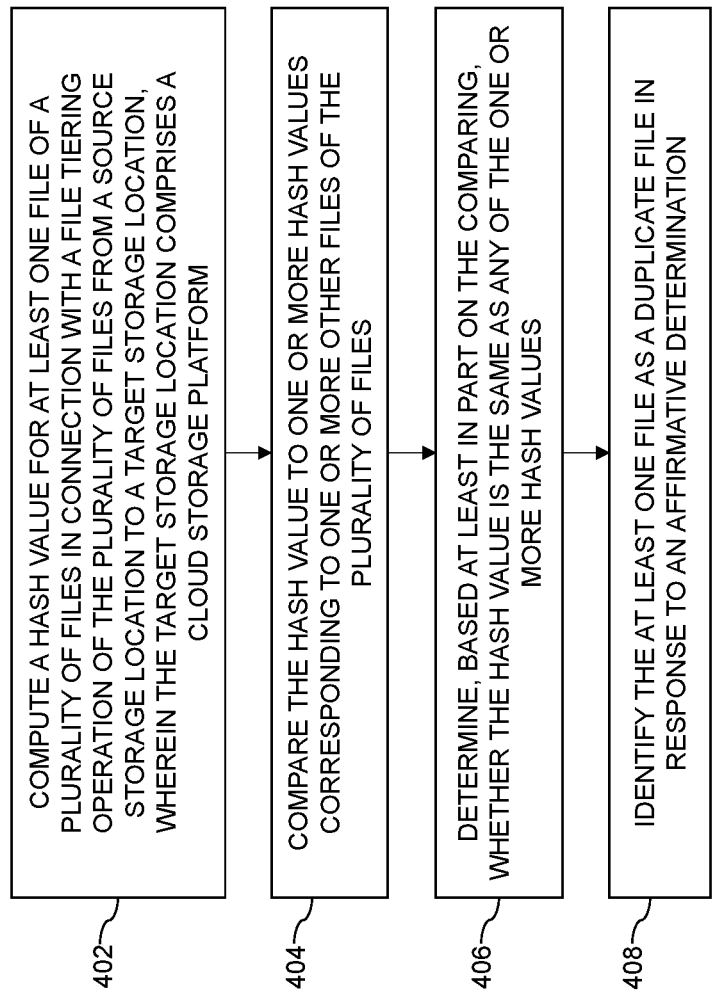
FIG. 4 depicts a process for identifying and preventing duplicate files from being stored in a cloud location according to an illustrative embodiment.

The operation of the information processing system 100 will now be described in further detail with reference to the flow diagram of FIG. 4. With reference to FIG. 4, a process 400 for identifying and preventing duplicate files from being stored in a cloud location as shown includes steps 402 through 408, and is suitable for use in the system 100 but is more generally applicable to other types of information processing systems comprising a cloud storage operation platform configured for implementing deduplication in connection with file tiering operations.

In step 402, a hash value is computed for at least one file of a plurality of files in connection with a file tiering operation of the plurality of files from a source storage location to a target storage location. The target storage location comprises, for example, a cloud storage platform 130, and the source storage location comprises, for example, a storage array 105.

In step 404, the hash value is compared to one or more hash values corresponding to one or more other files of the plurality of files. In step 406, based at least in part on the comparing, a determination is made whether the hash value is the same as any of the one or more hash values. A database for the one or more hash values is generated and maintained. The database further comprises one or more OIDs associated with one or more objects on the cloud storage platform for the one or more other files. The database is deleted following completion of the file tiering operation.

In step 408, the at least one file is identified as a duplicate file in response to an affirmative determination. In response to the affirmative determination, an OID is identified, wherein the OID is associated with an object on the cloud storage platform for a file of the plurality of files corresponding to a given hash value determined to be the same as the hash value for the at least one file. Also, in response to the affirmative determination, a stub file is generated for the at least one file. The stub file designates the OID associated with the object for the file of the plurality of files corresponding to the given hash value. In further response to the affirmative determination, the process further includes causing deletion of an object from the cloud storage platform that was generated for the at least one file.

In illustrative embodiments, in response to a negative determination, the at least one file is identified as a unique file, and the hash value of the at least one file is added to the database for the one or more hash values. An object is generated on the cloud storage platform for the at least one file. An OID for the object is also generated. The OID is added to the database in response to the negative determination. A stub file for the at least one file designating the OID is generated.

In one or more embodiments, the cloud storage operation platform 110 causes the generation of one or more reference counter tags for one or more objects on the cloud storage platform corresponding to one or more tiered files of the plurality of files. The one or more reference counter tags indicate a number of stub files designating respective objects of the one or more objects.

In illustrative embodiments, a request to delete at least one object of the one or more objects from the cloud storage platform (e.g., delete orphan request) is received. The cloud storage operation platform 110 causes deletion of the at least one object responsive to the request when a reference counter tag of the one or more reference counter tags corresponding to the at least one object indicates a value of 1. When the reference counter tag corresponding to the at least one object indicates a value greater than 1, the cloud storage operation platform 110 causes reduction by 1 of the indicated value responsive to the request without causing deletion of the at least one object.

It is to be appreciated that the FIG. 4 process and other features and functionality described above can be adapted for use with other types of information systems configured to execute deduplication in connection with file tiering operations in a cloud storage operation platform or other type of platform.

The particular processing operations and other system functionality described in conjunction with the flow diagram of FIG. 4 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously use deduplication to eliminate redundant files on a cloud storage platform. Under conventional techniques, when files are tiered, all of the files are tiered to the cloud storage location, even if they are duplicate files. In other words, with current approaches, there is a one-to-one mapping between files and cloud objects (i.e., for each tiered file, there is a cloud object) regardless of whether the files are duplicate files. Such techniques waste crucial cloud storage space on duplicate files and unnecessarily consume compute resources when tiering the duplicate files.

Advantageously, the embodiments compare hash values of files to determine duplicate files, create one cloud object for duplicate files and have corresponding stub files for duplicate files point to the single cloud object. If there are multiple stub files in a file system pointing to the same cloud object, the embodiments provide technical solutions to avoid unwanted deletion of the cloud object. For example, the illustrative embodiments advantageously add a reference counter custom tag to cloud objects which tracks how many references (e.g., how many stub files) point to the same cloud object. When a delete orphan request is received for a cloud object, if the number of references is one, the cloud object is deleted. If the number of references is greater than one, the reference count is decreased by one in response to the delete orphan request, and the cloud object is not deleted. In illustrative embodiments, when recalling a file from cloud storage, a callback daemon of a CTA retrieves the OID of the files to be recalled.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
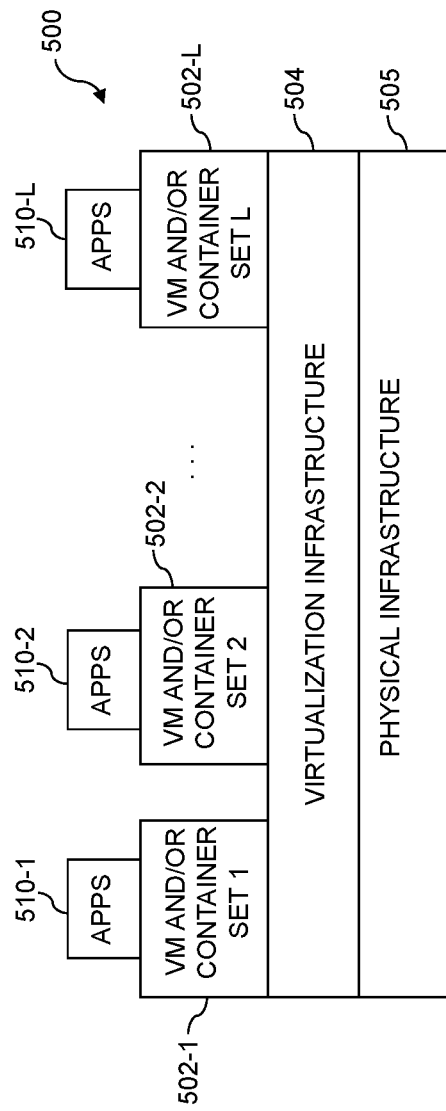
FIGS. 5 and 6 show examples of processing platforms that may be utilized to implement at least a portion of an information processing system according to illustrative embodiments.
Figure 6:
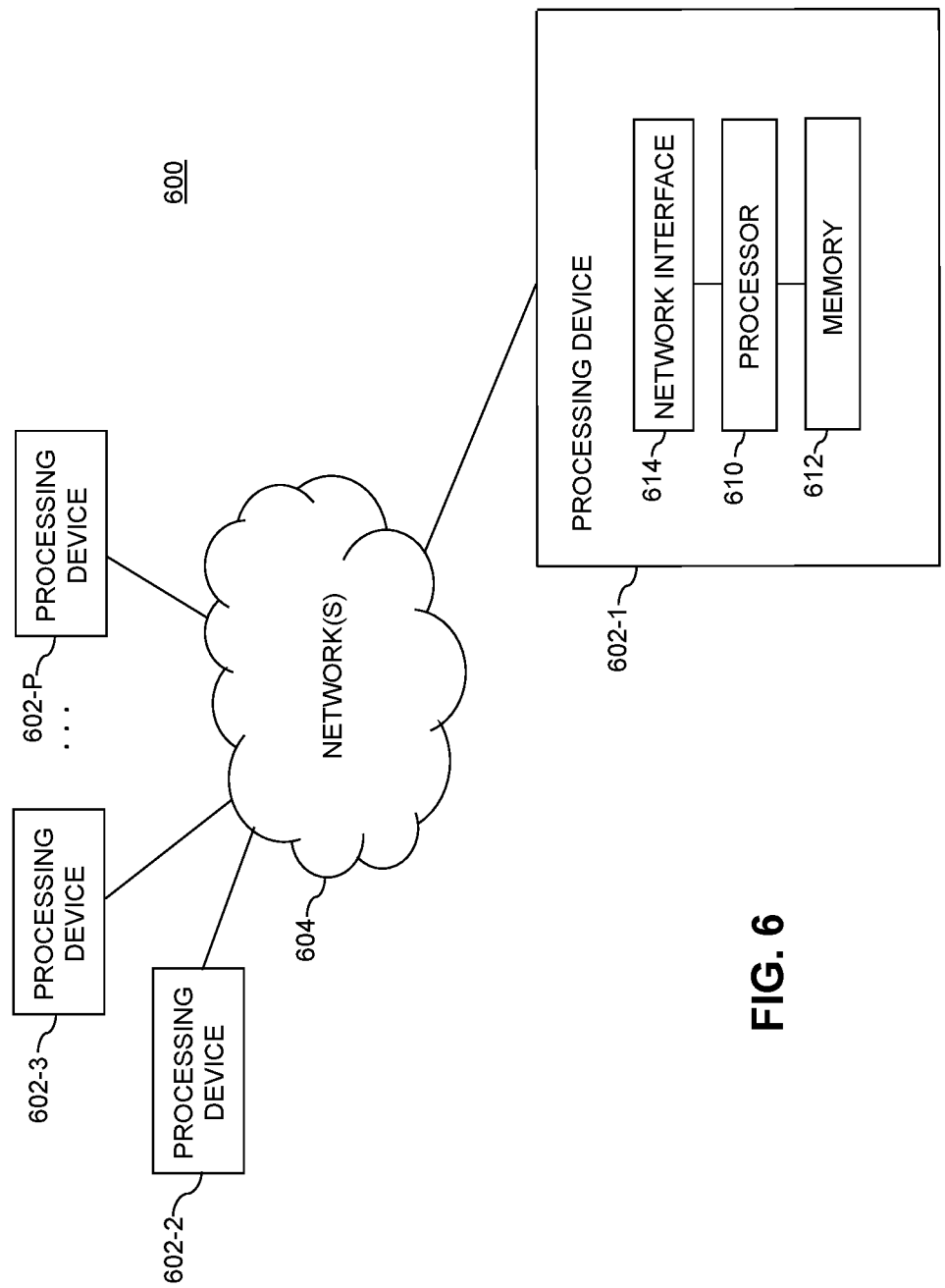

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-P, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It is to be appreciated that steps/operations that are described as being performed by a processing platform can be directly performed by the processing platform and/or the processing platform can cause the step/operation to be performed by another component by the processing platform sending one or more instructions or messages to the other component.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processing device;
   said at least one processing platform being configured:
   to select at least one file of a plurality of files for a file tiering operation of the plurality of files from a source storage location to a target storage location, wherein the target storage location comprises a cloud storage platform;
   to read a plurality of data portions of the at least one file;
   to write data from the plurality of data portions to a first object on the cloud storage platform;
   to compute respective hash values for respective ones of the plurality of data portions;
   to compute a hash value for the at least one file based at least in part on the respective hash values for the respective ones of the plurality of data portions;
   to compare the hash value for the at least one file to one or more hash values corresponding to one or more other files of the plurality of files, wherein the one or more hash values are stored in a database;
   to determine, based at least in part on the comparing, whether the hash value for the at least one file is the same as any of the one or more hash values;
   to identify the at least one file as a duplicate file and to delete the first object from the cloud storage platform in response to an affirmative determination;
   to identify an object identifier associated with a second object on the cloud storage platform in further response to the affirmative determination, the second object comprising data from a file of the plurality of files corresponding to a given hash value determined to be the same as the hash value for the at least one file;
   to determine an end of the file tiering operation of the plurality of files; and
   to delete the database in response to determining the end of the file tiering operation of the plurality of files.

2. The apparatus of claim 1 wherein, in further response to the affirmative determination, said at least one processing platform is further configured to generate a stub file for the at least one file designating the object identifier associated with the second object.

3. The apparatus of claim 1 wherein said at least one processing platform is further configured to generate and maintain the database for the one or more hash values.

4. The apparatus of claim 3 wherein the database comprises the object identifier associated with the second object and one or more other object identifiers associated with one or more other objects on the cloud storage platform for the one or more other files of the plurality of files and corresponding to the one or more hash values.

5. The apparatus of claim 1 wherein said at least one processing platform is further configured to identify the at least one file as a unique file in response to a negative determination.

6. The apparatus of claim 5 wherein said at least one processing platform is further configured:
to generate and maintain the database for the one or more hash values; and
to add the hash value for the at least one file to the database in further response to the negative determination.

7. The apparatus of claim 6 wherein said at least one processing platform is further configured:
to cause generation of the first object on the cloud storage platform;
to generate an object identifier for the first object in further response to the negative determination; and
to add the object identifier for the first object to the database in further response to the negative determination.

8. The apparatus of claim 7 wherein said at least one processing platform is further configured to generate a stub file for the at least one file designating the object identifier for the first object in further response to the negative determination.

9. The apparatus of claim 1 wherein said at least one processing platform is further configured to cause generation of one or more reference counter tags for one or more objects on the cloud storage platform corresponding to one or more tiered files of the plurality of files, wherein the one or more reference counter tags indicate a number of stub files designating respective objects of the one or more objects.

10. The apparatus of claim 9 wherein said at least one processing platform is further configured:
to receive a request to delete at least one object of the one or more objects from the cloud storage platform;
to cause deletion of the at least one object responsive to the request when a reference counter tag of the one or more reference counter tags corresponding to the at least one object indicates a value of 1; and
when the reference counter tag corresponding to the at least one object indicates a value greater than 1, to cause reduction by 1 of the indicated value responsive to the request without causing deletion of the at least one object.

11. The apparatus of claim 1 wherein said at least one processing platform comprises a cloud tiering appliance.

12. A method comprising:
selecting at least one file of a plurality of files for a file tiering operation of the plurality of files from a source storage location to a target storage location, wherein the target storage location comprises a cloud storage platform;
reading a plurality of data portions of the at least one file;
writing data from the plurality of data portions to a first object on the cloud storage platform;
computing respective hash values for respective ones of the plurality of data portions;
computing a hash value for the at least one file based at least in part on the respective hash values for the respective ones of the plurality of data portions;
comparing the hash value for the at least one file to one or more hash values corresponding to one or more other files of the plurality of files, wherein the one or more hash values are stored in a database;
determining, based at least in part on the comparing, whether the hash value for the at least one file is the same as any of the one or more hash values;
identifying the at least one file as a duplicate file and deleting the first object from the cloud storage platform in response to an affirmative determination;
identifying an object identifier associated with a second object on the cloud storage platform in further response to the affirmative determination, the second object comprising data from a file of the plurality of files corresponding to a given hash value determined to be the same as the hash value for the at least one file;
determining an end of the file tiering operation of the plurality of files; and
deleting the database in response to determining the end of the file tiering operation of the plurality of files;
wherein the method is performed by at least one processing platform comprising at least one processing device comprising a processor coupled to a memory.

13. The method of claim 12 further comprising generating, in further response to the affirmative determination, a stub file for the at least one file designating the object identifier associated with the second object.

14. The method of claim 12 further comprising identifying the at least one file as a unique file in response to a negative determination.

15. The method of claim 14 further comprising:
generating and maintaining the database for the one or more hash values; and
adding the hash value for the at least one file to the database in further response to the negative determination.

16. A computer program product comprising a non-transitory processor-readable storage medium having stored therein program code of one or more software programs, wherein the program code when executed by at least one processing platform causes said at least one processing platform:
to select at least one file of a plurality of files for a file tiering operation of the plurality of files from a source storage location to a target storage location, wherein the target storage location comprises a cloud storage platform;
to read a plurality of data portions of the at least one file;
to write data from the plurality of data portions to a first object on the cloud storage platform;
to compute respective hash values for respective ones of the plurality of data portions;
to compute a hash value for the at least one file based at least in part on the respective hash values for the respective ones of the plurality of data portions;
to compare the hash value for the at least one file to one or more hash values corresponding to one or more other files of the plurality of files, wherein the one or more hash values are stored in a database;
to determine, based at least in part on the comparing, whether the hash value for the at least one file is the same as any of the one or more hash values;

to identify the at least one file as a duplicate file and to delete the first object from the cloud storage platform in response to an affirmative determination;

to identify an object identifier associated with a second object on the cloud storage platform in further response to the affirmative determination, the second object comprising data from a file of the plurality of files corresponding to a given hash value determined to be the same as the hash value for the at least one file;

to determine an end of the file tiering operation of the plurality of files; and to delete the database in response to determining the end of the file tiering operation of the plurality of files.

17. The computer program product of claim 16 wherein, in further response to the affirmative determination, the program code further causes said at least one processing platform to generate a stub file for the at least one file designating the object identifier associated with the second object.

18. The computer program product of claim 16 wherein the program code further causes said at least one processing platform to identify the at least one file as a unique file in response to a negative determination.

19. The computer program product of claim 18 wherein the program code further causes said at least one processing platform:

to generate and maintain the database for the one or more hash values; and to add the hash value for the at least one file to the database in further response to the negative determination.

20. The computer program product of claim 19 wherein the program code further causes said at least one processing platform:

to cause generation of the first object on the cloud storage platform;

to generate an object identifier for the first object in further response to the negative determination; and to add the object identifier for the first object to the database in further response to the negative determination.

* * * * *